(12) United States Patent
    Romano

(10) Patent No.: US 10,920,902 B2
(45) Date of Patent: Feb. 16, 2021

(54) BELLOWS-ENABLED BLEED VALVE

(71) Applicant: Senior IP GmbH, Schaffhausen (CH)

(72) Inventor: Christopher M. Romano, Weymouth, MA (US)

(73) Assignee: Senior IP GmbH, Schaffhausen (CH)

( * ) Notice: Subject to any disclaimer, the term of this patent is extended or adjusted under 35 U.S.C. 154(b) by 203 days.

(21) Appl. No.: 16/149,860

(22) Filed: Oct. 2, 2018

(65) Prior Publication Data

US 2020/0103046 A1 Apr. 2, 2020

(51) Int. Cl.
*F16K 31/128* (2006.01)
*F01D 17/10* (2006.01)
*F02C 9/18* (2006.01)

(52) U.S. Cl.
CPC .......... *F16K 31/128* (2013.01); *F01D 17/105* (2013.01); *F02C 9/18* (2013.01)

(58) Field of Classification Search
None
See application file for complete search history.

(56) References Cited

U.S. PATENT DOCUMENTS

| | | | |
|---|---|---|---|
| 2,649,108 A | 8/1953 | Best et al. | |
| 2,785,848 A | 3/1957 | Lombard et al. | |
| 2,965,285 A | 12/1960 | Schom et al. | |
| 3,487,993 A | 1/1970 | Rannenberg et al. | |
| 3,831,499 A * | 8/1974 | Andrews | F04B 45/02 92/45 |
| 4,251,985 A | 2/1981 | Sullivan | |
| 4,574,585 A | 3/1986 | Conn | |
| 4,716,927 A | 1/1988 | Vayra | |
| 5,033,505 A | 7/1991 | Eidsmore | |
| 5,385,012 A | 1/1995 | Rowe | |
| 6,050,292 A * | 4/2000 | Richman | F16K 31/1266 137/510 |
| 7,555,905 B2 | 7/2009 | Borcea | |
| 8,011,382 B2 * | 9/2011 | Franconi | F01D 17/105 137/485 |
| 2012/0167587 A1 | 7/2012 | Clark et al. | |
| 2016/0237915 A1 | 8/2016 | Villanueva et al. | |
| 2017/0356348 A1 * | 12/2017 | Ribarov | F01D 25/24 |
| 2018/0216539 A1 | 8/2018 | Widener et al. | |

FOREIGN PATENT DOCUMENTS

| | | |
|---|---|---|
| EP | 0367383 A2 | 5/1990 |
| GB | 587917 A | 5/1947 |
| WO | 8401609 A1 | 4/1984 |
| WO | 2013101795 A1 | 7/2013 |

OTHER PUBLICATIONS

European Patent Office, Extended Search Report issued in Application No. 19200478.6, dated Feb. 21, 2020, 10 pgs.

\* cited by examiner

*Primary Examiner* — Daphne M Barry
(74) *Attorney, Agent, or Firm* — Greenberg Traurig, LLP

(57) ABSTRACT

A bleed valve for use in a gas turbine engine of an aircraft includes a high-pressure cavity coupled to a valve housing, which includes a valve seat configured to be sealed by a system poppet. The system poppet is operably coupled to a shaft that is itself coupled to a movable end of a bellows, which is positioned within the high-pressure cavity. The opening and closing of the valve is controlled by at least one cavity air port that is configured to inject a first fluid into the high-pressure cavity, thus compressing the bellows, and by a servo air port that is configured to inject a second fluid directly into the bellows, to expand it.

27 Claims, 8 Drawing Sheets

BELLOWS-ENABLED BLEED VALVE

FIELD OF THE DISCLOSURE

The present invention relates to bleed valves used in the gas turbine engines of aircraft, and, in particular, to such bleed valves having a bellows for regulating the flow of gases, including air, from within the engine through the valve, and out into the surrounding environment.

BACKGROUND

Valves are well-known to be useful for regulating the flow of fluids. Moreover, compressible and expandable bellows structures have been known to be useful for controlling highly pressurized fluids to enable the facilitated regulation of such valves. For example, valves can be configured to be opened and closed through the use of bellows, which can expand and/or compress, based on the pressure of certain fluids contained within, and/or surrounding, the bellows.

In the context of gas turbine engines, it is also well known that valves may be necessary to bleed air away from the compressor section of the engine. For example, bleed valves may be helpful or even necessary during the start-up of the engine, in order to reduce the load needed to drive the compressor associated therewith. Bleed valves may also be used to ensure safe operating conditions in other situations during the operation of the engine, and, in turn, the aircraft.

For example, the compressor sections of gas turbine engines may be unstable, in that the airfoils can stall when the airflow is too low. In that situation, stall cells may form and rotate inside the compressor section, thereby compromising the performance and efficiency of the compressor, and, in turn, the engine. If the pressure rises sharply, there may be a risk that the entire engine could surge, thus resulting in flames being emitted out of the engine fan. In that situation, the engine would need to be shut down and restarted. This is a very difficult proposition if the surge occurs while the aircraft is in flight. Bleed valves may help to avoid such consequences by allowing air and other gases to escape, and by increasing the flow of air through the compressor.

Bleed valves may also be needed in other situations such as, for example, during a quick acceleration from idle to full power. In that situation, the front stages of a compressor section may be pumping air at a rate of flow and/or pressure that is much larger than the back stages of a compressor section may be able to accept. This mismatch in airflow and pressure throughout the entire compressor section may cause the compressor to stall. One or more bleed valve(s) may be used during these conditions to allow air from the front stages of the compressor section to escape. The valve(s) may then be closed when the engine again reaches a steady operating condition.

Bleed valves for these types of uses have been described in many different configurations. As aircraft engine technology continues to improve, however, there continues to be a need for bleed valves that are capable of withstanding higher pressures and temperatures. For example, current bleed valve technologies often utilize carbon seals as a dynamic or sliding sealing mechanism. Carbon seals present their own difficulties, however. For example, carbon seals are known to have temperature limitations, and high temperature applications can lead conventional carbon seals to fail. In addition, the use of carbon seals results in other problems or requirements; they can wear and/or degrade quickly, and thus they may require regular replacement or substantial maintenance. By way of example, in certain bleed valve technologies now in use, while many of the major components of the bleed valve may have a relatively long lifespan, the carbon seals within such a bleed valve may need to be regularly replaced in order to enable the bleed valve to fulfill that longer lifespan. Accordingly, certain advantages may be realized through a bleed valve design that completely eliminates the need for dynamic sliding seals made of carbon.

SUMMARY OF THE INVENTION

In one aspect of the present embodiments, a bleed valve is described for use in a gas turbine engine of an aircraft. The bleed valve comprises a high-pressure cavity having an interior surface, an interior volume, an exterior surface, a first end and a second end opposite the first end; and a valve housing having an exterior surface, a first end, a second end opposite the first end, and a plurality of apertures, said second end of said high-pressure cavity being coupled to said first end of said valve housing. The bleed valve further comprises a bellows for alternatively capturing and releasing one or more pressurized fluids. The bellows has an interior surface, an interior volume, an exterior surface, a first movable end and a second fixed end opposite the first movable end. The second fixed end of the bellows is operably coupled to one of the interior surface of the high-pressure cavity and the exterior surface of the valve housing, at a position substantially adjacent the second end of the high-pressure cavity.

The bleed valve further includes a shaft having a first end and a second end opposite the first end, where the first end of the shaft is operably coupled to the first movable end of the bellows, and the second end of the shaft is coupled to a system poppet configured to seal a valve seat substantially adjacent the second end of the valve housing. The shaft is also sealed relative to the interior surface of the bellows, to preclude the undesired entry and release of any of the pressurized fluids therefrom.

In addition, the bleed valve further comprises (i) at least one cavity air port configured to inject a first of the pressurized fluids into the interior volume of the high-pressure cavity about the exterior surface of the bellows, so as to exert a first pressure against the exterior surface of the bellows, thereby compressing the bellows; and (ii) at least one servo air port configured to inject a second of the pressurized fluids directly into the interior volume of the bellows, so as to exert a second pressure against the interior surface of the bellows, thereby expanding the bellows.

In some embodiments of the bleed valve described herein, the injection of the first and second of the one or more pressurized fluids via the at least one cavity air port and the servo air port, respectively, is collectively configured to be controllable by one of (a) a pilot of the aircraft, and (b) an onboard flight computer.

In some embodiments of the bleed valve described herein, the at least one cavity air port is encased within the valve housing.

In some embodiments of the bleed valve described herein, the servo air port is encased within the valve housing.

In some embodiments of the bleed valve described herein, the bellows has rectangular weld beads, such that when the bellows is compressed into its fully nested position, the rectangular weld beads stack on top of one another to form a solid, self-supporting cylindrical stack.

In some embodiments of the bleed valve described herein, the mean effective area of the bellows is larger than the mean effective area of the system poppet.

In some embodiments of the bleed valve described herein, the first movable end of the bellows is rigidly coupled and hermetically sealed to the shaft.

In some embodiments of the bleed valve described herein, the fixed end of the bellows is hermetically sealed against the release of the one or more pressurized fluids by a posterior surface of the system poppet.

In some embodiments of the bleed valve described herein, the rigid coupling and hermetic sealing of the first movable end of the bellows and the shaft is accomplished through welding.

In some embodiments of the bleed valve described herein, the rigid coupling and hermetic sealing of the first movable end of the bellows and the shaft is accomplished through laser welding.

In some embodiments of the bleed valve described herein, the bleed valve further comprises an over-travel element, wherein the bellows is configured to fully nest after the poppet has fully seated.

In some embodiments of the bleed valve described herein, the over-travel element comprises one or more flexure elements that are coupled to the first movable end of the bellows, thereby enabling the bellows to fully nest upon application of the first pressure, when the first pressure exceeds a threshold pressure required to enable the system poppet to seal against the valve seat.

In some embodiments of the bleed valve described herein, the shaft comprises a single, solid, integrated assembly without any internal cavities therewithin.

In some embodiments of the bleed valve described herein, the shaft comprises an internal shaft cavity, and the first end of the shaft is operably coupled to the first movable end of said bellows via a shaft extension having a first end and a second end opposite the first end. In these embodiments, the over-travel element may comprise a spring positioned inside the internal shaft cavity, with one end of the spring bearing against the second end of the shaft extension, to bias the system poppet into a position open and apart from the valve seat.

In some embodiments of the bleed valve described herein, the bleed valve is configured to be positioned within the compressor stage of the gas turbine engine.

In some embodiments of the bleed valve described herein, the bleed valve is configured to be positioned within the turbine stage of the gas turbine engine.

In some embodiments of the bleed valve described herein, the bleed valve is configured to be positioned within the combustor stage of the gas turbine engine.

In some embodiments of the bleed valve described herein, the bleed valve is configured, when in its closed position in which the system poppet is sealed against the valve seat, to be positioned such that a pressurized gas flowing through the compressor stage of the gas turbine engine is prevented from flowing through the valve seat.

In some embodiments of the bleed valve described herein, the bellows is configured to be in a compressed state when the valve is closed.

In some embodiments of the bleed valve described herein, the bellows is configured to be capable of further compression to a nested state when the valve is closed.

In some embodiments of the bleed valve described herein, the bleed valve further comprises an integrated filtration unit to prevent one or more contaminants from entering the high-pressure cavity.

In some embodiments of the bleed valve described herein, the integrated filtration unit comprises one or more filter discs positioned between the valve housing and the high-pressure cavity, within one of the one or more cavity air ports and the servo air port.

In some embodiments of the bleed valve described herein, the bleed valve further comprises one or more sealing elements in the form of a series of welded joints at the first movable end and the second fixed end of the bellows.

In some embodiments of the bleed valve described herein, the bleed valve further comprises one or more sealing elements in the form of an annular contact seal formed between a posterior surface of the system poppet and an interior surface of the valve housing.

In some embodiments of the bleed valve described herein, the bleed valve further comprises one or more sealing elements in the form of an annular sealing ring positioned between the second end of the high-pressure cavity and the first end of the valve housing.

In some embodiments of the bleed valve described herein, the bleed valve further comprises an end cap that is rigidly coupled and hermetically sealed to said first movable end of the bellows and said shaft.

These and other embodiments of the invention will be apparent in light of the present specification, claims and drawings.

DETAILED DESCRIPTION

Reference will now be made in detail to the preferred embodiments of the invention, examples of which are illustrated in the accompanying drawings. While the invention will be described in conjunction with the preferred embodiments, the invention is intended to cover alternatives, modifications and equivalents, which may be included within the spirit and scope of the invention as defined by the claims. Furthermore, in the detailed description of the present invention, several specific details are set forth in order to provide a thorough understanding of the present invention. However, one of ordinary skill in the art will appreciate that the present invention may be practiced with or without these specific details. Thus, while the invention is susceptible to embodiment in many different forms, the subsequent description of the present disclosure should be considered as an exemplification of the principles of the invention, and is not intended to limit the invention to the embodiments so illustrated.

Figure 1:
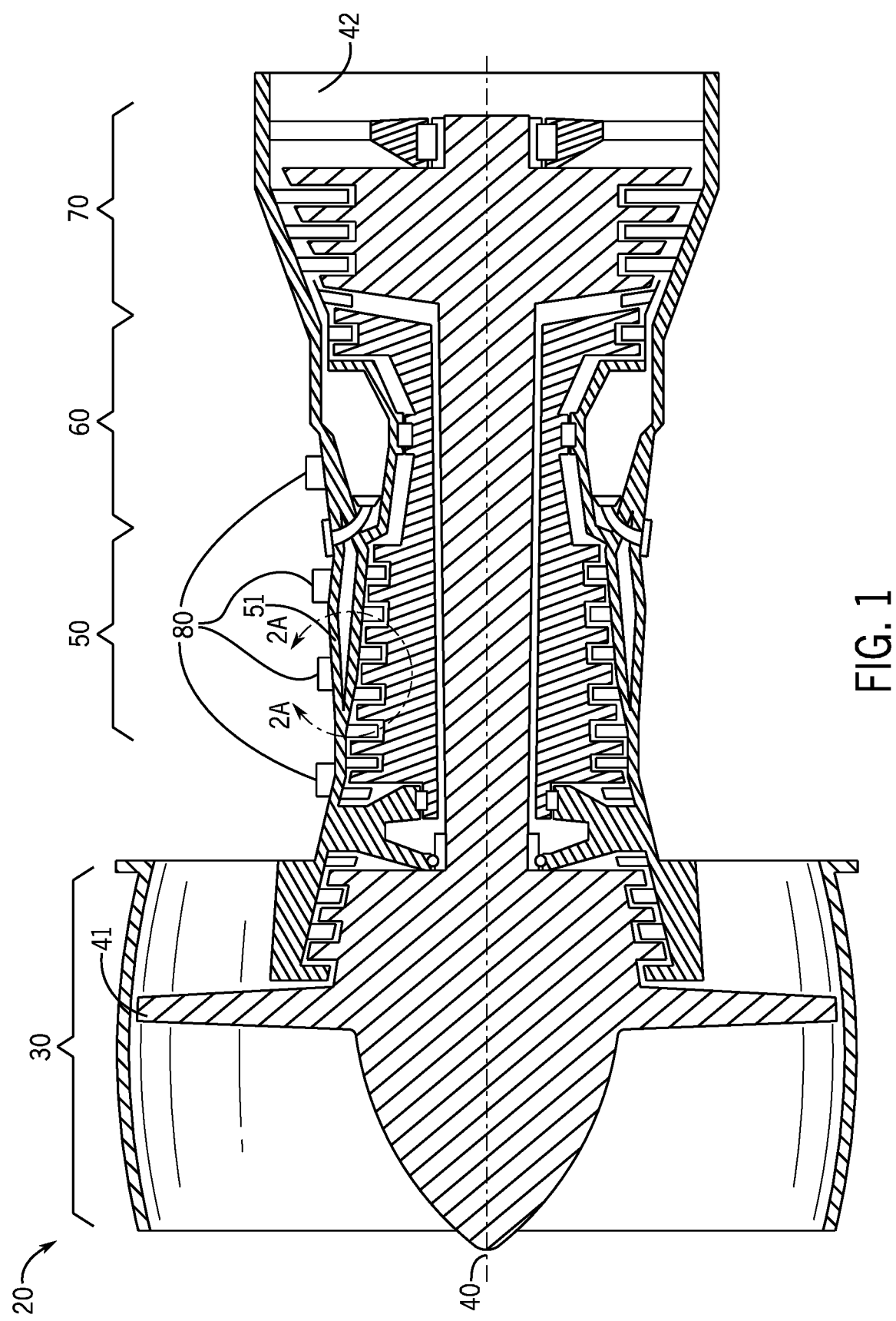
FIG. 1 is a schematic, cross-sectional view of an example gas turbine engine.

FIG. 1 depicts one type of gas turbine engine 20. As is known in this field, gas turbine engine may include a fan section 30, which moves air and rotates about central axis 40. As fan 41 rotates within fan section 30, air is pushed towards the rear of the engine 42 along central axis 40, successively into each of compressor section 50, combustor section 60, and turbine section 70, respectively, each of which is also centered along central axis 40. Exemplary bleed valve 80 is shown positioned on compressor casing 51 of compressor section 50. Gas turbine engine 20 may incorporate numerous bleed valves 80 in various locations. While much of the discussion below assumes that bleed valve 80 is mounted on compressor section 50 of gas turbine engine 20, the various embodiments of bleed valve 80 discussed below may likewise be positioned in any of the other sections of gas turbine engine 20, including on combustor section 60 and turbine section 70. FIG. 1 schematically shows only the key components of a gas turbine engine, and it will be understood that numerous other components of such an engine are not shown for the sake of simplicity. Further, while one of skill in the art would recognize that gas turbine engine 20, shown in FIG. 1, is one particular type of the many gas turbine engines known in the field, it should be understood that the present invention extends to other types of gas turbine engines.

Figure 2A:
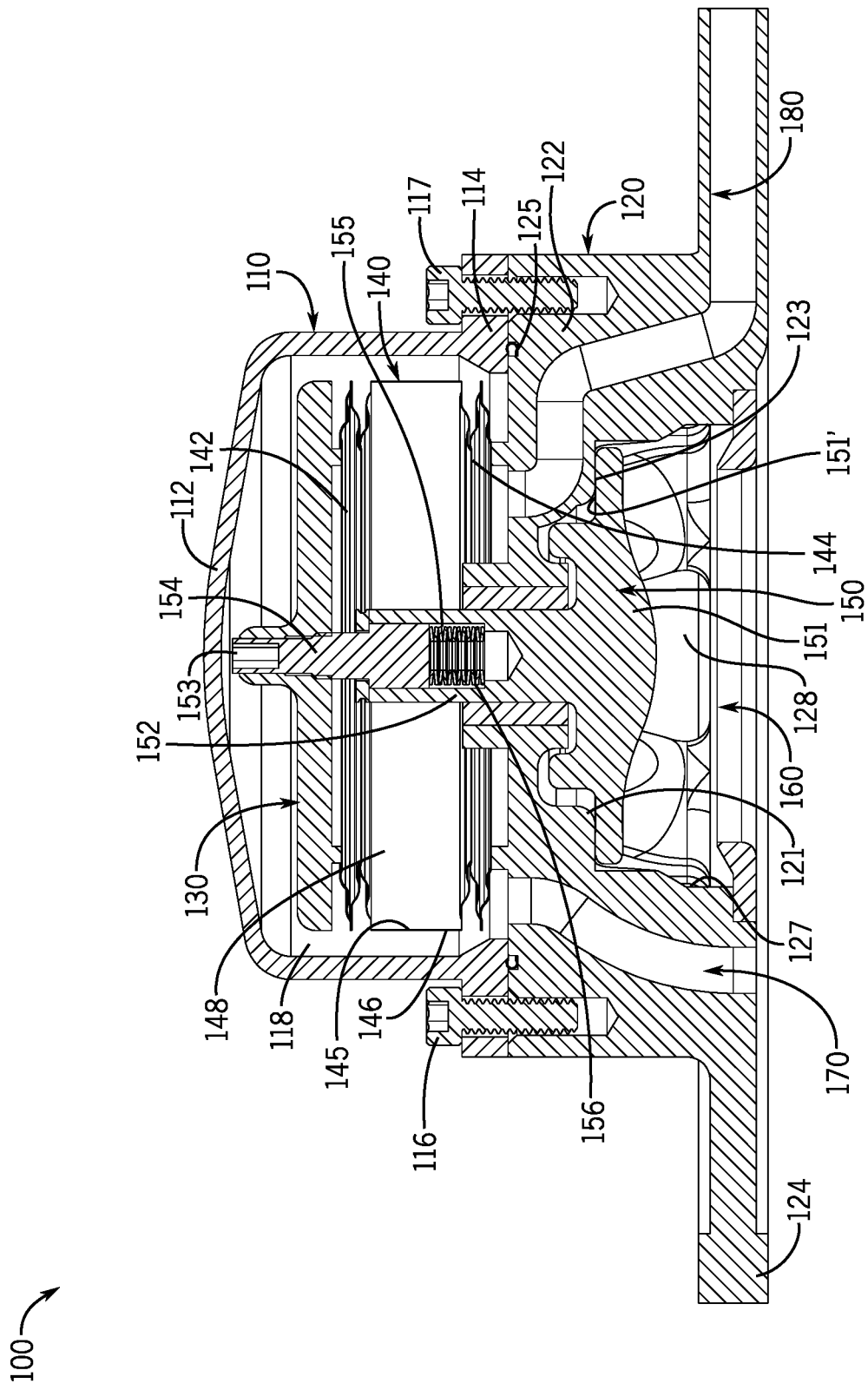
FIG. 2A is an elevated cross-sectional view of a bleed valve corresponding to a first embodiment of the present invention, in which the valve is shown in its open position.
Figure 2B:
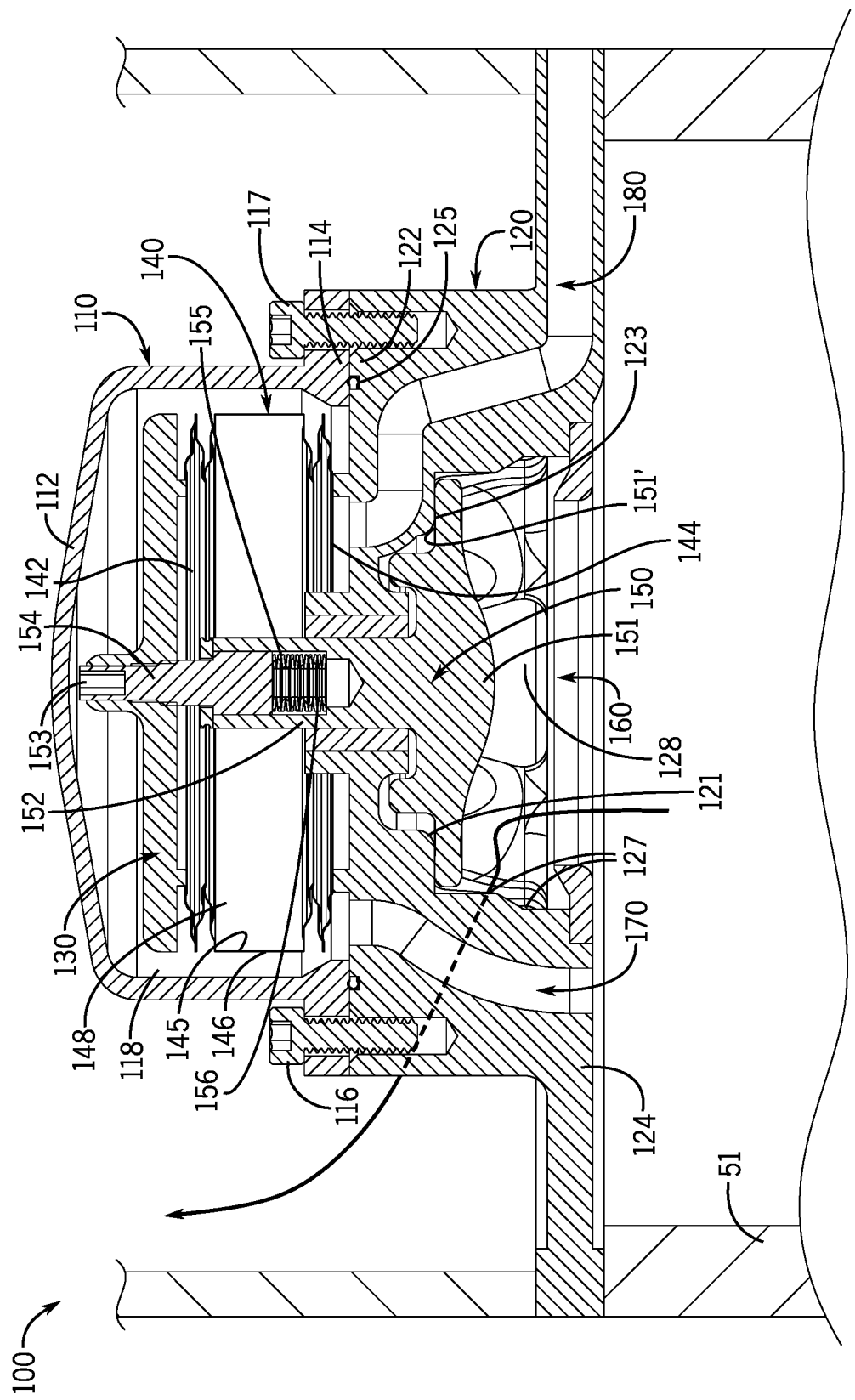
FIG. 2B is an elevated cross-sectional view of the bleed valve of FIG. 2A, with the valve again shown in its open position, in which the valve is shown in one potential environment in which the valve may be used, i.e., mounted onto the casing of the compressor section of a gas turbine engine.

FIGS. 2A-2B depict an elevated cross-sectional view of an exemplary preferred embodiment of a bleed valve according to the present invention, namely, bleed valve 100. Bleed valve 100 includes high-pressure cavity 110 and valve housing 120, which are rigidly coupled together so as to create a hermetically sealed interior volume within high-pressure cavity 110. In the embodiment shown in FIGS. 2A-2B, high-pressure cavity 110 is coupled to valve housing 120 via fastener elements 116, 117, which in this case are bolts 116, 117. However, one of ordinary skill in the art would appreciate that high-pressure cavity 110 and valve housing 120 may likewise be rigidly coupled together in a variety of ways, including through adhesives or welding, or they may be formed as a single, integrated piece.

In FIGS. 2A-2B, the first end 112 of high-pressure cavity 110 is positioned at the top of high-pressure cavity 110, whereas second opposite end 114 of high-pressure cavity 110 is rigidly coupled to first or top end 122 of valve housing 120. Within high-pressure cavity 110 is positioned bellows 140, which has its own first, top end 142 and second, bottom end 144. Second end 144 of bellows 140 is fixed, and is rigidly coupled and hermetically sealed to either (a) the second end 114 of high-pressure cavity 110, or (b) the first, top end 122 of valve housing 120. By contrast, first end 142 of bellows 140 is movable, and is configured (within the orientation of FIGS. 2A-2B) to reciprocate upwardly and downwardly within high-pressure cavity 110. In this embodiment, first end 142 of bellows 140 is rigidly coupled and hermetically sealed to end cap 130, for joint reciprocating movement within high-pressure cavity therewith. Bellows 140 further comprises interior surface 145, exterior surface 146 and interior volume 148.

As also shown in FIGS. 2A-2B, bleed valve 100 may further comprise a plurality of sealing elements configured to hermetically seal interior volume 148 of bellows 140. As one example of such a sealing element, first end 142 of bellows 140 may be welded, such as laser-welded, to end cap 130 to hermetically seal first end 142 of bellows 140. As another example, second end 144 of bellows 140 may be welded, such as laser-welded, to either second end 114 of high-pressure cavity 110, or to first end 122 of valve housing 120, to likewise hermetically seal second end 144 of bellows 140. Another sealing element may comprise annular sealing ring 125, which is positioned between second end 114 of high-pressure cavity 110 and first end 122 of valve housing 120.

Bellows 140, and specifically first end 142 of bellows 140, is operably coupled to system poppet 150 by way of shaft 152 and shaft extension 154. Beyond the end of shaft 152 is positioned the sealing portion 151 of system poppet 150, which cooperates with valve seat 160 to prevent the passage of a fluid (typically, air) through valve seat 160, where the fluid can exit through apertures 127, 128 to the outside atmosphere. First end 153 of shaft extension 154 may be rigidly coupled and hermetically sealed to end cap 130 by welding, such as by laser welding. Such welded joints between end cap 130, first end 142 of bellows 140, and shaft extension 154 (or integrated shaft 252, discussed below relative to FIG. 6) and shaft end 153 seal end cap 130, relative to bellows 140.

However, it will be appreciated that there are a variety of configurations in which first end 142 of bellows 140 could be coupled, directly or indirectly, to system poppet 150. For example, shaft 152 may simply be formed as a single integrated piece with system poppet 150, in which shaft 152 extends up to first end 142 of bellows 140. That configuration can be seen in FIG. 6, in which system poppet 250 is coupled to first end 242 of bellows 240 via integrated shaft 252.

As shown in FIGS. 2A-2B, 3 and 4, system poppet 150 is configured to cooperate with valve seat 160, which is positioned in second end 124 of valve housing 120. In view of the rigid coupling of system poppet 150, indirectly, to first end 142 of bellows 140, the combination of bellows 140 and system poppet 150 serves as a reciprocating valve configured to seal valve seat 160, based on the pressures exerted both upon the exterior of bellows, as well as from within the interior of bellows 140. Specifically, in bleed valve 100's open configuration, as shown in FIGS. 2A-2B, interior volume 148 of bellows 140 is pressurized with a significant amount of fluid, via servo air port 180, an amount that is sufficient to exert pressure onto interior surface 145 of bellows 140, forcing bellows 140 into its expanded position. However, high pressure cavity 110 of bleed valve 100 is likewise configured to describe an interior volume 118, which can be pressurized by another fluid via air port(s) 170, to thereby exert a force about exterior surface 146 of bellows 140, towards forcing bellows 140 into its compressed position (shown in FIGS. 3-4).

Pressurizing bellows 140 and high-pressure cavity 110, to thereby open or close bleed valve 100, respectively, are actions that may be controlled or performed by a pilot of the aircraft, or by an onboard flight computer. The actions can be specifically carried out via one or more air ports for carrying and injecting air or other fluids. For example, high-pressure cavity 110 may be pressurized by injecting air or another fluid via one or more cavity air ports, such as air port 170. Doing so will compress bellows 140, thereby moving first end 142 of bellows 142 towards second end 114 of high-pressure cavity 110, and pushing system poppet 150 downwardly, and sealing second end 151 of shaft 152 against valve seat 160, thus closing bleed valve 100.

By contrast, bellows 140 may be pressurized to expand, by injecting air or another fluid via servo air port 180. As explained further below, doing so will allow bellows 140 to expand, in part due to the spring bias force inherent in bellows 140, as well as due to any additional pressure introduced by way of air or other fluids entering into bellows 140 from servo air port 180. As part of the expansion of bellows 140, first end 142 of bellows 140 will move towards first end 112 of high-pressure cavity 110, thus pushing system poppet 150 upwardly, and opening bleed valve 100. While the drawings show cavity air port 170 and servo air port 180 as being encased within valve housing 120, one of skill in the art would understand that the air ports 170, 180 may be configured to be separate from valve housing 120.

FIG. 2B of the drawings shows bleed valve 100 installed on compressor casing 52 (see FIG. 1), such that air from within compressor section 50 of jet engine 20 can enter a bleed valve, such as bleed valve 100, via valve seat 160, to enable the escape of such air or gas to the outside atmosphere, via apertures 127, 128 in valve housing.

Figure 3:
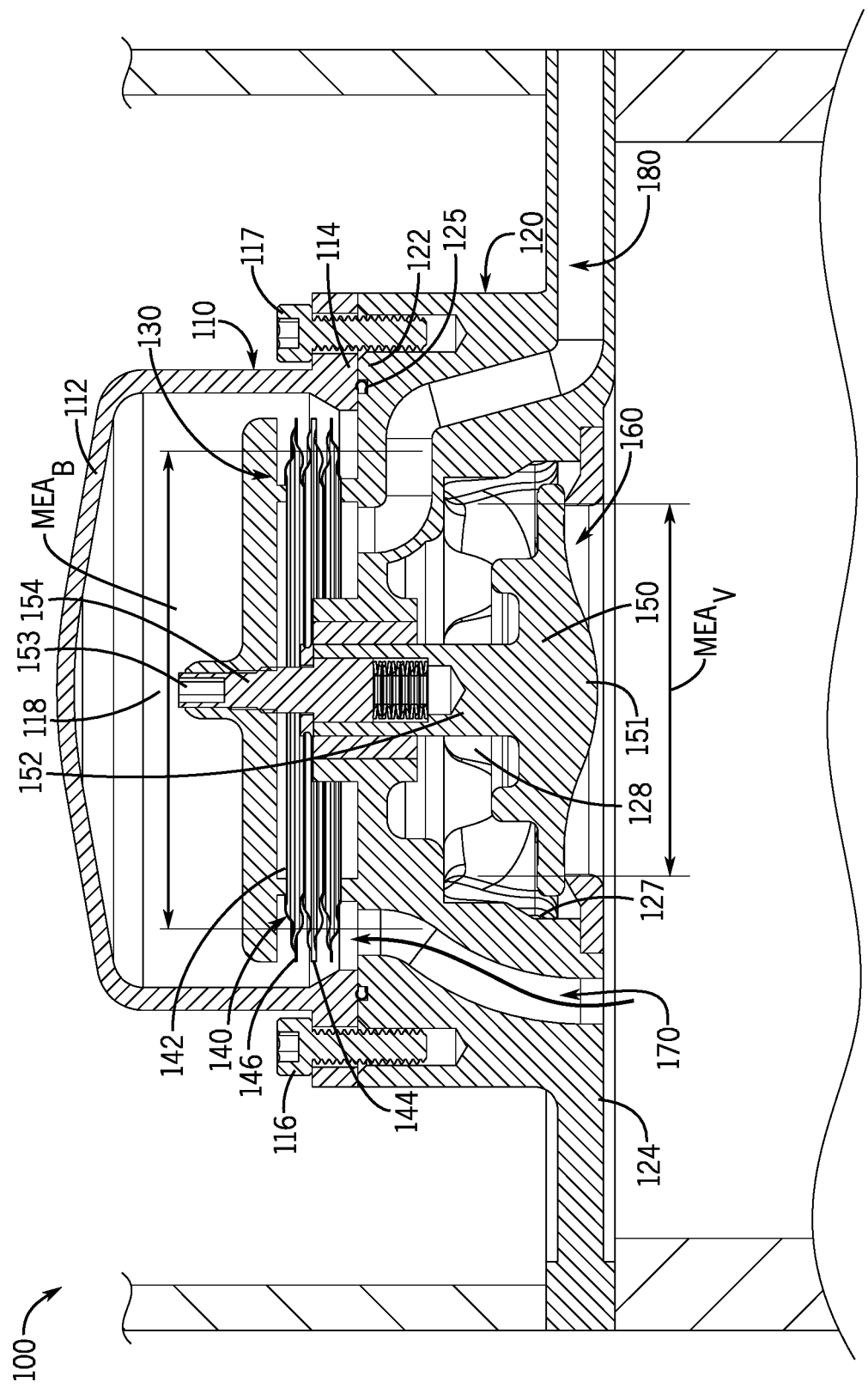
FIG. 3 is an elevated cross-sectional view of the bleed valve of FIGS. 2A-2B, with the valve shown in its closed position in which the bellows is partially compressed, such that the system poppet has just been sealed against the valve seat.

FIG. 3 of the drawings shows bleed valve 100 in its initially closed configuration, in which second end 151 of system poppet 150 has just made contact with, and has been sealed against, valve seat 160. This was accomplished by injecting air or another fluid into the interior volume 118 of high-pressure cavity 110 via cavity air port(s) 170, thus compressing bellows 140. Notably, however, in the configuration shown in FIG. 3, bellows 140 is, in part, compressed, but it is not fully compressed into a nested position. As will be described relative to FIG. 4, the ability of bellows 140 to fully compress into a substantially nested position provides additional advantages over conventional bleed valves.

Figure 4:
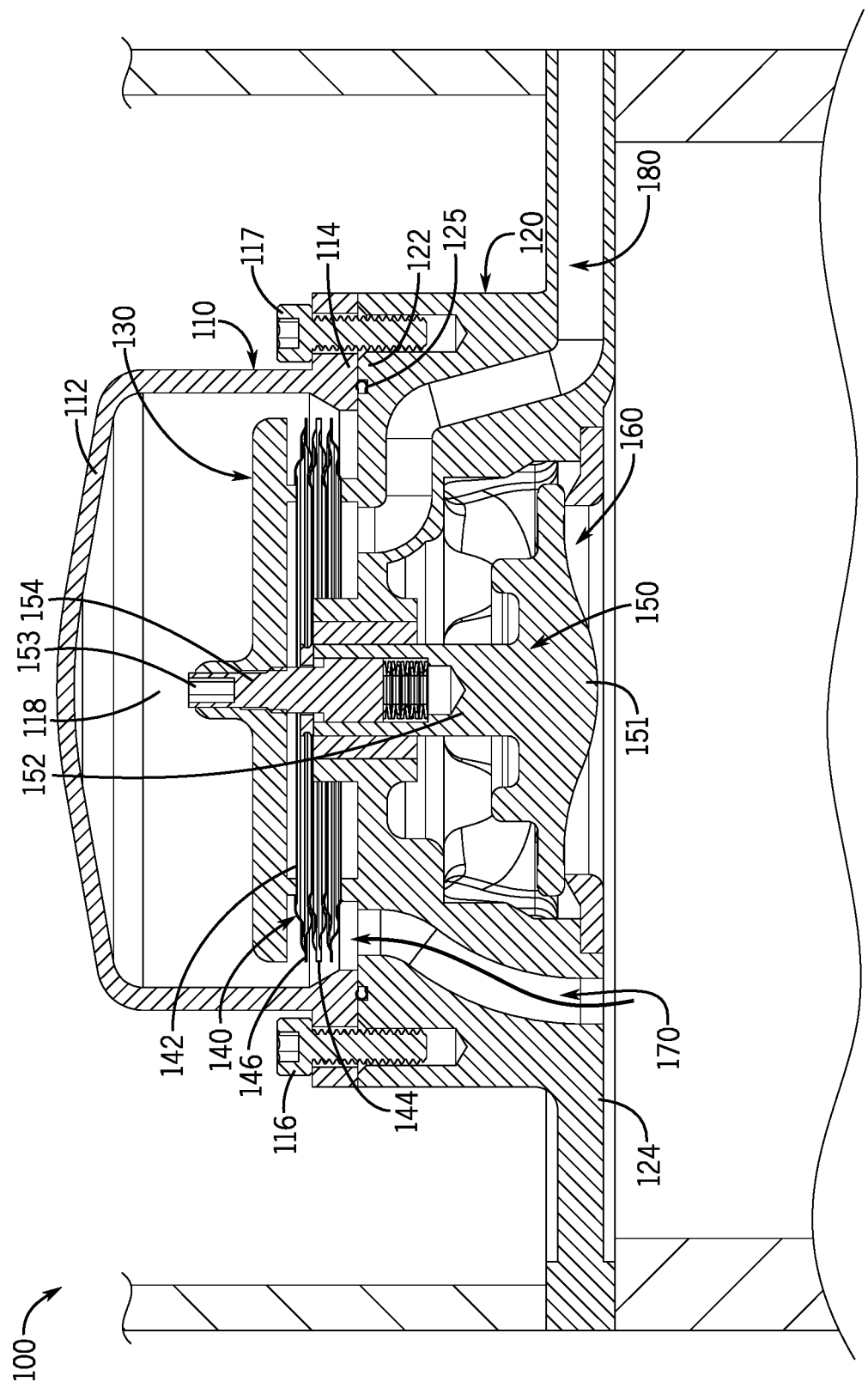
FIG. 4 is an elevated cross-sectional view of the bleed valve of FIGS. 2A-2B, with the valve shown in a position in which the bellows is fully compressed into a nested position, such that the system poppet is forcibly sealed against the valve seat.

In the closed position of bleed valve 100, as shown in FIGS. 3-4, when bleed valve 100 is positioned on the compressor section 50 of a jet engine 20, bleed valve 100 is configured to be positioned such that pressurized gases flowing through the compressor section 50 are prevented from flowing through valve seat 160. As also seen in FIGS. 3-4, bellows 140 is configured to be in a compressed state when bleed valve 100 is closed.

Bleed valves 100 and 200 feature two aspects that are designed to reduce the load borne by the valves—and that each render the present bleed valve "self-compensating," i.e., that ensure that bleed valves 100, 200 stay closed when they are intended to be closed and open when they are intended to be open. First, as shown in the orientation of FIG. 3, it can be seen that the mean effective area of bellows 140, $MEA_B$, is greater than the mean effective area of second end 151 of system poppet 150, where it seals against valve seat 160, $MEA_V$ (i.e., $MEA_B > MEA_V$). Many conventional designs use an opposite configuration, in which the mean effective area of the system poppet is greater than the mean effective area of the bellows. In these cases, when such a conventional valve is positioned in its closed state, the system poppet is exposed to significant amounts of pressure from the compressor section of the engine, which can generate significant amounts of force against the system poppet and sealing surface, which force carries through to the valve body and shaft. Such approaches typically require the system poppet, valve seat, shaft and valve body to each be strong enough to withstand the significant degrees of force generated by the compressor, thereby requiring such valves to add additional materials, at a higher cost, in order to avoid failure of the valve. Maintaining the mean effective area of bellows 140 greater than the mean effective area of system poppet 150 minimizes the total amount of force that valve 100 must be able to withstand, thereby reducing the forces on the valves, resulting in significantly lower valve failure rate. In the present invention, bleed valve 100 is self-compensating, and is more likely to stay closed, when intended.

Second, bleed valve 100 is self-compensating because system poppet 150 is configured to move downwardly towards valve seat 160, the same downward direction in which bellows 140 is compressing, and shaft 152 is moving. In this way, any failure of bellows 140, such as failure of any sealing elements of the bellows, will cause valve 100 to move into its closed configuration. A configuration in which bellows 140 compresses in the same high-pressure direction in which system poppet 150 closes and seals against valve seat 160, again makes it more likely that a net positive force will push system poppet 150 into a position to seal against valve seat 160.

The present invention further contemplates the selection and use of a specific type of bellows, or that the amount of compression (or "precompression") in bellows 140 may be "factory set" or adjusted, to ensure that the operating pressure differentials are maintained within specified and/or optimized performance limits. One way that this is achieved is by adjusting the position of end cap 130 relative to the sealing end 151 of system poppet 150. In other words, setting a prescribed distance between end cap 130 and sealing end 151 of system poppet 150 can be utilized to regulate or define an intended spring bias inherent in bellows 140, thus bleed valve 100 to operate within preferred operating parameters.

FIG. 4 depicts bleed valve 100 in its fully closed configuration, which is achieved after a partially closed configuration, through the injection of additional air or another fluid into the interior volume 118 of high-pressure cavity 110 via cavity air port(s) 170, thereby compressing bellows 140 to its fully compressed, fully nested, position. Compressing bellows 140 to its nested position provides significant advantages over conventional bleed valves. Specifically, since bleed valve 100 is intended to be used in an environment with significant amounts of vibration (e.g., on the compressor casing 51 of a gas turbine engine 20), it is advantageous for bellows 140 to be fully compressed to its nested condition in order to dampen the bellows. An undamped bellows, such as that shown in FIGS. 2A-2B and 3, will be subjected to significant vibration. As noted above, bleed valve 100 will occupy its closed position for most of its operating life, and may be opened solely for startup of the engine, and also potentially for taxiing, transient events, take-off and landing. Since bellows 140 is in its nested position when bleed valve 100 is fully closed, and since bleed valve 100 will spend most of its operating life in that fully closed position, the lifespan of bellows 140—and, thus, of bleed valve 100—will be significantly lengthened by the fact that bellows 140 is nested, and dampened during most of its operation. The significant degree of vibration to which bellows 140 and bleed valve 100 are exposed and must endure over their respective life spans could greatly enhance the risk of catastrophic failure of bleed valve 100 and/or bellows 140, if bellows 140 was in any of its uncompressed, un-nested states during such enduring vibration.

In contrast, many conventional bleed valves utilize designs in which either a bellows or an energized spring is positioned into an expanded state when the valve is closed. Since the valve will be closed during the vast majority of its operating life, the expanded bellows and/or springs in such valves will be constantly subjected to significant amounts of vibration, thus increasing the risk that the bellows and/or springs in such valves will break or fail. The design disclosed herein improves upon those conventional bleed valves by minimizing such risk of catastrophic bellows failure, through the elimination of risks associated with strong vibrations affecting bellows and/or springs in their expanded states. By designing bleed valve 100 to incorporate bellows 140, which is fully compressed to its nested state when bleed valve 100 is closed (and, thus, for most of the operating life of bleed valve 100), the design disclosed herein is believed to substantially increase the life span of the valve.

Figure 5:
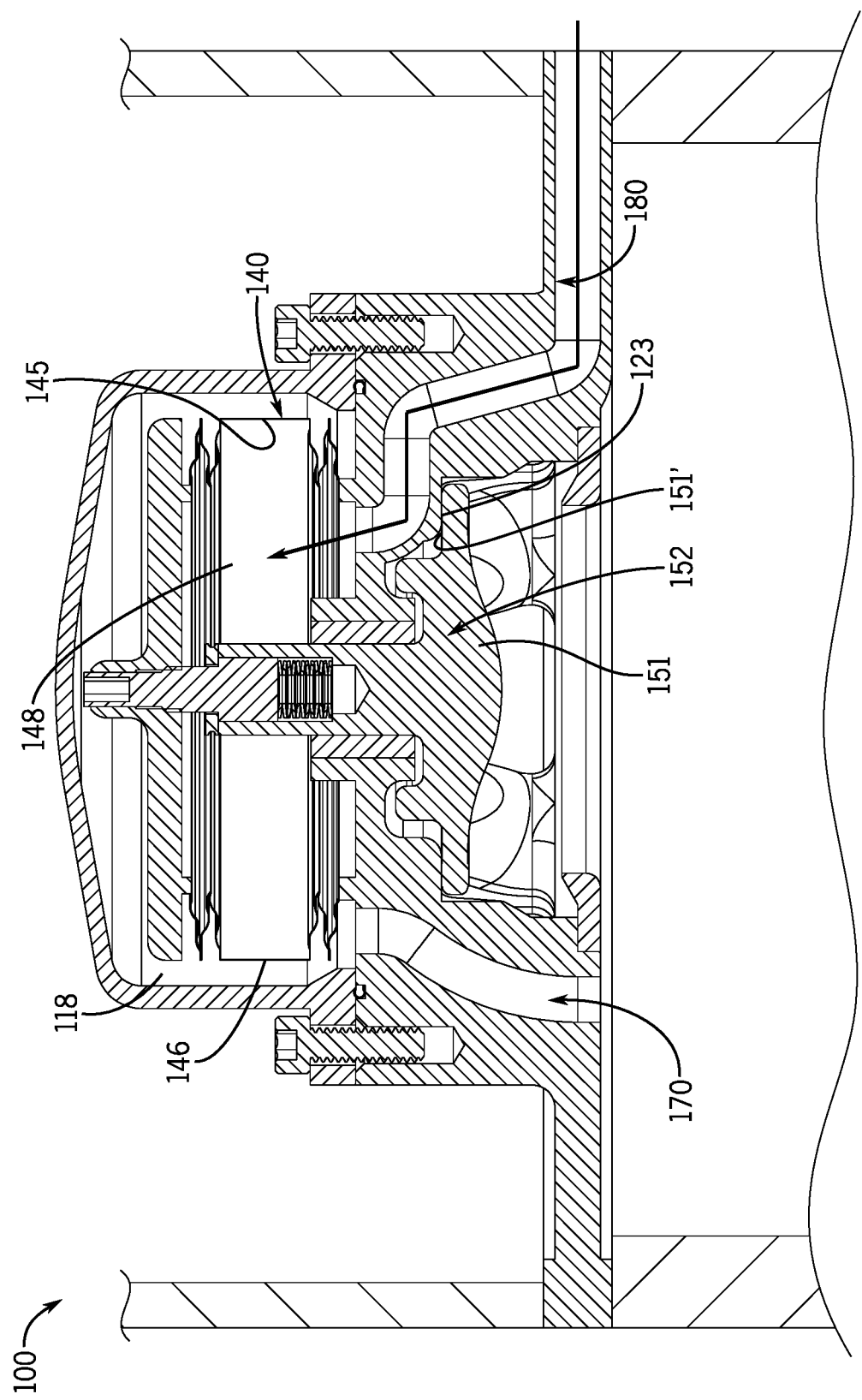
FIG. 5 is a cross-sectional view of the bleed valve of FIGS. 2A-2B, with the valve shown in a position in which the bellows has been forced to expand again to its original open position.

FIG. 5 of the drawings depicts bleed valve 100 in its open state, after it has been redirected to its open orientation. The valve is opened by injecting air or another fluid through servo air port 180, and directly into bellows 140. As additional air or fluid is injected into bellows 140, that air or fluid exerts a pressure against the internal surface 145 of bellows 140. While the spring force of bellows 140 serves to essentially open the valve, the servo air pressure will act to further reduce the pressure differential across bellows 140, to expand bellows 140 with the inherent spring bias of bellows 140. The servo air pressure may meet or exceed the bellows' external pressure, but exceeding the external pressure is not required to open the valve. Simply put, bellows 140 may be configured to utilize its own inherent spring bias, such that injecting air or fluid into bellows 140 via servo air port 180 reduces the pressure differential across bellows 140, such that bellows 140 may expand into its open position. When the pressure against internal surface 145 of bellows 140 meets or exceeds the amount of pressure exerted against external surface 146 of bellows 140 by the air or fluid within internal volume 118 of high-pressure cavity 110, the inherent spring bias of bellows 140 may enable bellows 140 to expand until it reaches its fully expanded state. In that state, an additional backup sealing element may be utilized to ensure that no air or other fluid escapes from within interior volume 148 of bellows 140. Specifically, when valve 100 is in its open position, posterior surface 151' of system poppet 150 may form an annular metal-to-metal contact seal 123 at its upper end, sealing posterior surface 151' against interior surface 121 of valve housing 120.

Figure 6:
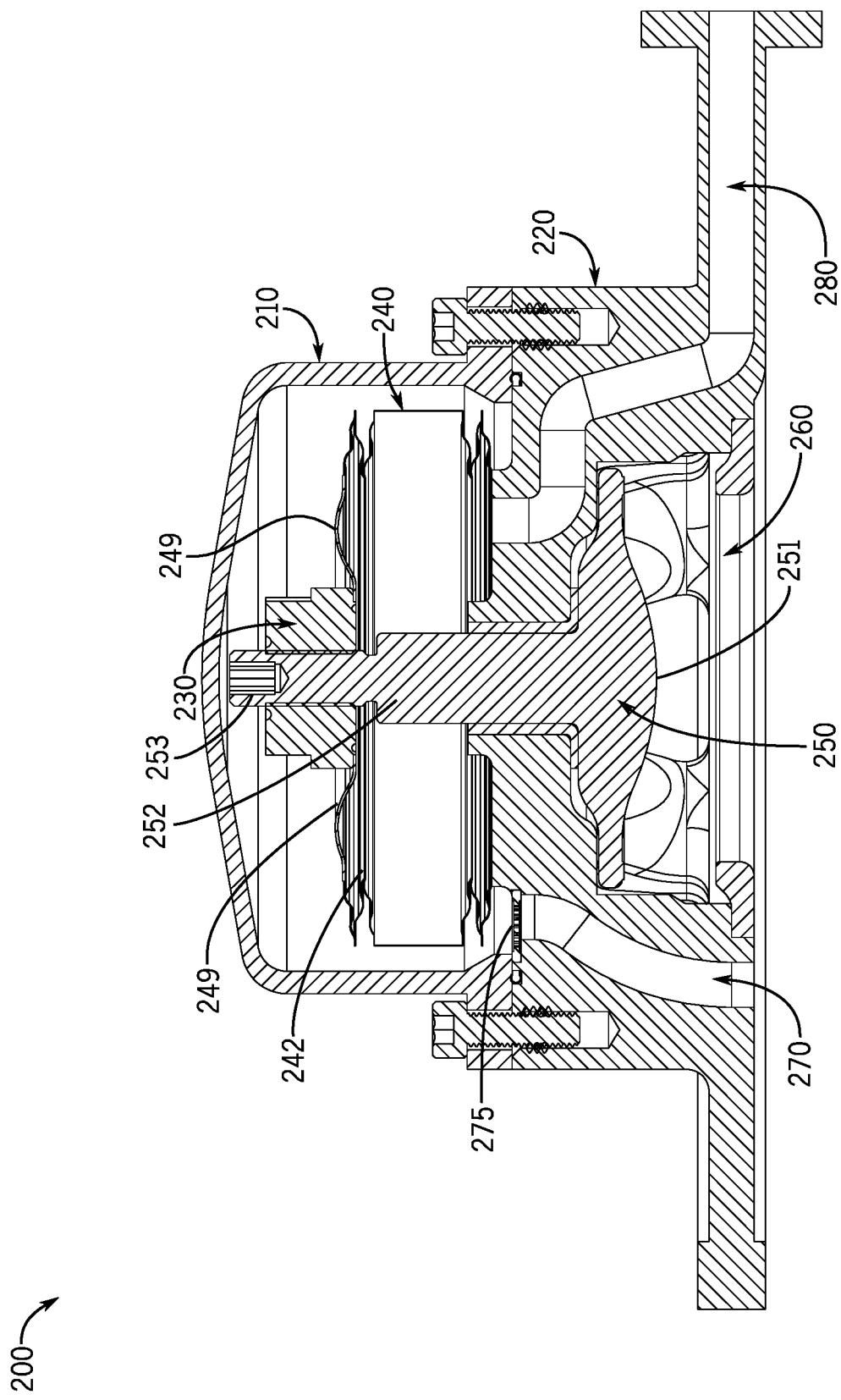
FIG. 6 is an elevated cross-sectional view of a bleed valve corresponding to a second embodiment, in which the shaft that connects the movable end cap of the bellows to the system poppet comprises a single, solid, integrated assembly without any internal cavities therewithin, also with the bleed valve in its open position.

FIG. 6 of the drawings shows a second embodiment of a bleed valve according to the present disclosure, in the form of bleed valve 200. Bleed valve 200 differs from bleed valve 100 in a few ways. Most notably, bleed valve 200 incorporates system poppet 250 in which shaft 252, which connects first end 253 of system poppet 250 and movable end cap 230 of bellows 240 to the second end 251 of system poppet 250, comprises a single, solid, integrated assembly 252, without any internal cavities therewithin.

The structure of FIG. 6 is in contrast with shaft 152 of system poppet 150, shown in FIGS. 2A-2B, which incorporates internal shaft cavity 155, in which spring 156 is positioned. Internal shaft cavity 155 and spring 156, together with shaft extension 154, collectively comprise one example design for an "over travel" element, which enables bellows 140 to fully nest into a solid, cylindrical, self-supporting stack after system poppet 150 has fully seated against valve seat 160. This "over travel" element limits the amount of stress that may be applied onto valve seat 160 and system poppet 150 (and, in turn, the amount of stress that may be applied onto other elements of bleed valve 100, such as bellows 140 or high-pressure cavity 110), when significant stage pressures are generated in compressor section 50 of gas turbine engine 20. It is expected that stage pressures may reach greater than 400 psi, and allowing bellows 140 to fully compress into its nested position (shown in FIG. 4) well below that 400 psi limit serves to minimize the total forces that may be applied across bleed valve 100. This, in turn, allows for the selection of materials that weigh less, and that are less costly, thus improving the functionality of bleed valve 100 without adding significant weight or cost.

A second, alternative design for the "over travel" element is shown in FIG. 6. This embodiment does not include the use of an internal shaft cavity, a spring, or a shaft extension. Instead, bleed valve 200 includes bellows 240, which incorporates certain flexure elements 249 welded to the first end 242 of bellows 240. Flexure elements 249 are depicted in FIG. 6 as comprising curved portions welded to first end 242 of bellows 240. One of skill in the art would understand that the exact curvatures and locations depicted may be varied without departing from the scope of the invention. Flexure elements 249 serve to enable bellows 240 to fully nest into a substantially solid condition after system poppet 250 has fully seated against valve seat 260, thereby limiting the amount of stress that bleed valve 200 may endure.

FIG. 6 depicts yet another design feature that may be useful in expanding the life span of bleed valve 200 in many embodiments. It is expected that contaminants, including sand, rocks, bones, and the lining of engine casings, among others, may impinge upon bleed valve 200, and specifically may be introduced into high-pressure cavity 210, valve housing 220, or other components of bleed valve 200. Without any protection from such contaminant particles, bleed valve 200 could be severely damaged, or could fail. Thus, bleed valve 200 includes an integrated filtration unit 275 intended to prevent contaminants from entering high pressure-cavity 210 and causing damage to bellows 240 or other sensitive portions of bleed valve 200. Integrated filtration unit 275 may comprise one or more filter discs that are positioned between valve housing 220 and high-pressure cavity 210, within cavity air port 270. While integrated filtration unit 275 is shown in one particular location, other or additional integrated filtration units may be included in other locations, including, potentially, within servo air port 280.

Figure 7:
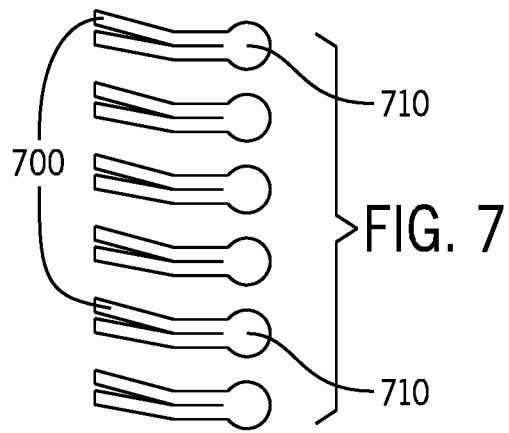
FIG. 7 is a cross-sectional view of a portion of a standard edge-welded bellows featuring spherical weld beads, shown in an extended position.
Figure 8:
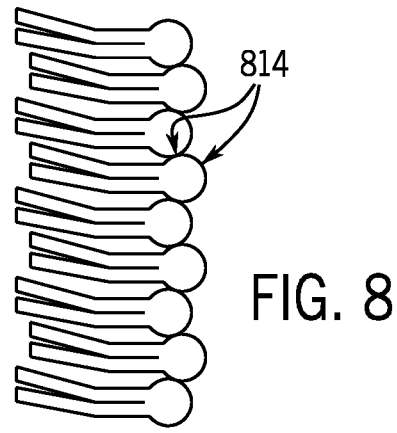
FIG. 8 is a cross-sectional view of the portion of the standard edge-welded bellows of FIG. 7 shown in a nested position.

As shown in FIGS. 7 and 8, a standard edge-welded bellows (not fully shown) consists of bellow plates 700 having circular weld beads 710 at each welding location. When the bellows is extended, as shown in FIG. 7, circular weld beads 700 function normally. However, when the bellows is fully compressed under a relatively high pressure on the order of 100 psi, circular weld beads 710 will be compacted together. Due to their circular shape, the arcs 814 of each adjacent weld bead could shear, creating an imperfect alignment, resulting in the displaced configuration shown in FIG. 8. Unlimited shearing can lead to failure of the bellows, which could result in a catastrophic failure of a bleed valve.

Figure 9:
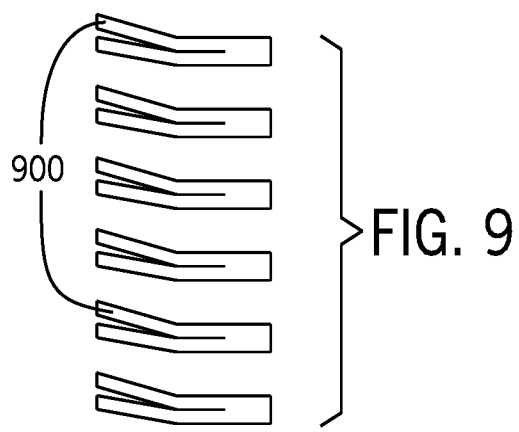
FIG. 9 is a cross-sectional view of a portion of an edge-welded bellows featuring rectangular weld beads, shown in an extended position.
Figure 10:
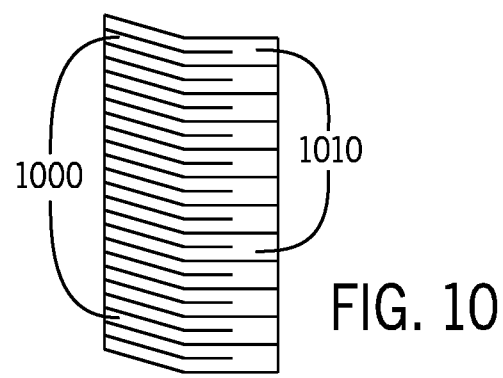
FIG. 10 is a cross-sectional view of a portion of the edge-welded bellows of FIG. 9, shown in a nested position.

One method for increasing the overall strength and integrity of an edge-welded bellows is to weld the plates together such that the weld beads are substantially rectangular in shape. In FIG. 9, the edge-welded bellows (not fully shown) consists of bellows plates 900 having rectangular, internal weld beads 910. When such a bellows is compressed into its fully nested position, as shown in FIG. 4, rectangular weld beads 910 stack neatly, and efficiently, on top of one another. Thus, when nested, a bellows having rectangular weld beads 910 forms a solid, self-supporting cylindrical stack, capable of withstanding much higher pressures than the standard bellows shown in FIGS. 7 and 8. Such bellows having rectangular weld beads are available from Senior Aerospace Metal Bellows corporation of Sharon, Mass., and are sold under the trademark HIPRES®, which trademark is owned by the assignee of the present application.

The foregoing description and drawings merely explain and illustrate the invention. However, the invention is not intended to be limited to any one particular embodiment or combination of elements shown in connection with any particular drawing, as those skilled in the art who have the disclosure before them will be able to make modifications and variations therein without departing from the scope of the invention.

Further, the foregoing description presents a best mode contemplated for carrying out the present embodiments, and of the manner and process of practicing them, in such full, clear, concise, and exact terms as to enable any person skilled in the art to which they pertain to practice these embodiments. The present embodiments are susceptible to modifications and alternate constructions from those discussed above, which modifications and alternate constructions are equivalent to those discussed above. Consequently, the present invention is not limited to the particular embodiments disclosed. On the contrary, the present invention covers all modifications and alternate constructions coming within the spirit and scope of the present disclosure, and within the scope of the claims.

I claim:

1. A bleed valve for use in a gas turbine engine of an aircraft, the bleed valve comprising:
    a high-pressure cavity having an interior surface, an interior volume, an exterior surface, a first end and a second end opposite said first end;
    a valve housing having an exterior surface, a first end, a second end opposite said first end, and a plurality of apertures, said second end of said high-pressure cavity being coupled to said first end of said valve housing;
    a bellows for alternatively capturing and releasing one or more pressurized fluids, said bellows having an interior surface, an interior volume, an exterior surface, a first movable end and a second fixed end opposite said first movable end, said second fixed end of said bellows being operably coupled to one of said interior surface of said high-pressure cavity and said exterior surface of said valve housing, at a position substantially adjacent the second end of said high-pressure cavity;
    a shaft having a first end and a second end opposite said first end, said first end of said shaft being operably coupled to the first movable end of said bellows, said second end of said shaft being coupled to a system poppet configured to seal a valve seat substantially adjacent the second end of said valve housing, said shaft being sealed relative to the interior surface of said bellows to preclude the undesired entry and release of any of said pressurized fluids therefrom;
    at least one cavity air port configured to inject a first of said pressurized fluids into the interior volume of said high-pressure cavity about the exterior surface of said bellows, so as to exert a first pressure against said exterior surface of said bellows, thereby compressing said bellows; and
    at least one servo air port configured to inject a second of said pressurized fluids directly into the interior volume of said bellows, so as to exert a second pressure against said interior surface of said bellows, thereby expanding said bellows,
    said bleed valve being configured to be self-compensating, such that when the bleed valve is in its closed configuration, said system poppet is oriented to be sealed against the valve seat, with the bellows in its compressed position.

2. The bleed valve of claim 1, in which the injection of said first and second of said one or more pressurized fluids via said at least one cavity air port and said servo air port, respectively, being collectively configured to be controllable by one of (a) a pilot of said aircraft, and (b) an onboard flight computer.

3. The bleed valve of claim 1, in which said at least one cavity air port is encased within said valve housing.

4. The bleed valve of claim 1, in which said servo air port is encased within said valve housing.

5. The bleed valve of claim 1, in which said bellows has rectangular weld beads, such that when said bellows is compressed into its fully nested position, said rectangular weld beads stack on top of one another to form a solid, self-supporting cylindrical stack.

6. The bleed valve of claim 1, in which the bleed valve is further configured to be self-compensating, with the mean effective area of said bellows being larger than the mean effective area of said system poppet.

7. The bleed valve of claim 1, in which the first movable end of the bellows is rigidly coupled and hermetically sealed to said shaft.

8. The bleed valve of claim 7, in which the rigid coupling and hermetic sealing of said first movable end of the bellows and said shaft is accomplished through welding.

9. The bleed valve of claim 8, in which the rigid coupling and hermetic sealing of said first movable end of the bellows and said shaft is accomplished through laser welding.

10. The bleed valve of claim 1, in which the fixed end of the bellows is hermetically sealed against the release of said one or more pressurized fluids by a posterior surface of said system poppet.

11. The bleed valve of claim 1, in which the bleed valve further comprises an over-travel element, wherein the bellows is configured to fully nest after the poppet has fully seated.

12. The bleed valve of claim 11, in which said over-travel element comprises one or more flexure elements that are coupled to the first movable end of the bellows, thereby enabling the bellows to fully nest upon application of said first pressure, when said first pressure exceeds a threshold pressure required to enable the system poppet to seal against the valve seat.

13. The bleed valve of claim 12, in which said shaft comprises a single, solid, integrated assembly without any internal cavities therewithin.

14. The bleed valve of claim 11, in which said shaft comprises an internal shaft cavity, and said first end of said shaft is operably coupled to said first movable end of said bellows via a shaft extension having a first end and a second end opposite said first end, and wherein said over-travel element comprises a spring positioned inside said internal shaft cavity, with one end of said spring bearing against said second end of said shaft extension, to bias said system poppet into a position open and apart from said valve seat.

15. The bleed valve of claim 1, in which the bleed valve is configured to be positioned within the compressor stage of said gas turbine engine.

16. The bleed valve of claim 15, in which the bleed valve is configured, when in its closed position in which said system poppet is sealed against said valve seat, to be positioned such that a pressurized gas flowing through said compressor stage of said gas turbine engine is prevented from flowing through said valve seat.

17. The bleed valve of claim 1, in which the bleed valve is configured to be positioned within the turbine stage of said gas turbine engine.

18. The bleed valve of claim 1, in which the bleed valve is configured to be positioned within the combustor stage of said gas turbine engine.

19. The bleed valve of claim 1, in which the bellows is configured to be in a compressed state when the valve is closed.

20. The bleed valve of claim 1, in which the bellows is configured to be capable of further compression to a nested state when the valve is closed.

21. The bleed valve of claim 1, in which the bleed valve further comprises an integrated filtration unit to prevent one or more contaminants from entering the high-pressure cavity.

22. The bleed valve of claim 21, in which the integrated filtration unit comprises one or more filter discs positioned between said valve housing and said high-pressure cavity, within one of said one or more cavity air ports and said servo air port.

23. The bleed valve of claim 1, further comprising one or more sealing elements in the form of a series of welded joints at the first movable end and the second fixed end of the bellows.

24. The bleed valve of claim 23, further comprising one or more sealing elements in the form of an annular contact seal formed between a posterior surface of the system poppet and an interior surface of the valve housing.

25. The bleed valve of claim 24, further comprising one or more sealing elements in the form of an annular sealing ring positioned between the second end of the high-pressure cavity and the first end of the valve housing.

26. The bleed valve of claim 1, further comprising an end cap that is rigidly coupled and hermetically sealed to said first movable end of the bellows and said shaft.

27. The bleed valve of claim 1, in which the system poppet is configured to move towards the valve seat, while the bellows compresses in the same direction in which the system poppet is moving towards the valve seat.

* * * * *